(12) United States Patent
Lipka et al.

(10) Patent No.: US 12,110,871 B2
(45) Date of Patent: Oct. 8, 2024

(54) WIND TURBINE ROTOR BLADE AND METAL SHEET

(71) Applicant: Nordex Energy SE & Co. KG, Hamburg (DE)

(72) Inventors: Thomas Lipka, Rostock (DE); Gerald Festner, Klein Krams (DE); Benedikt Haspel, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/262,339

(22) PCT Filed: Jan. 11, 2022

(86) PCT No.: PCT/EP2022/050385
§ 371 (c)(1),
(2) Date: Jul. 20, 2023

(87) PCT Pub. No.: WO2022/161759
PCT Pub. Date: Aug. 4, 2022

(65) Prior Publication Data
US 2024/0084784 A1  Mar. 14, 2024

(30) Foreign Application Priority Data
Jan. 27, 2021 (EP) .................................. 21153710

(51) Int. Cl.
*F03D 80/30* (2016.01)
*F03D 1/06* (2006.01)

(52) U.S. Cl.
CPC ......... *F03D 80/301* (2023.08); *F03D 1/0675* (2013.01); *F05B 2240/302* (2013.01); *F05B 2260/301* (2013.01)

(58) Field of Classification Search
CPC ...... F03D 80/30; F03D 80/301; F03D 1/0675; F05B 2240/301; F05B 2240/302; Y02E 10/72
See application file for complete search history.

(56) References Cited

U.S. PATENT DOCUMENTS 11,982,256 B2 * 5/2024 Lipka ..................... F03D 80/30
2007/0290118 A1 * 12/2007 Stiesdal ............... F03D 1/0675
290/55

(Continued)

FOREIGN PATENT DOCUMENTS

EP  1 950 414 A2   7/2008
EP  2 243 955 A2  10/2010

(Continued)

OTHER PUBLICATIONS

International Search Report of the European Patent Office dated Apr. 12, 2022 for international application PCT/EP2022/050385 on which this application is based.

(Continued)

*Primary Examiner* — Justin D Seabe
*Assistant Examiner* — Wayne A Lambert
(74) *Attorney, Agent, or Firm* — Walter Ottesen, P.A.

(57) ABSTRACT

The segments of a segmented wind turbine rotor blade are screwed together at respective connection ends via a plurality of connecting bolts. Sleeve-shaped pressure pieces are arranged between the rotor blade segments, each of which is mounted on a connecting bolt. A plurality of first metal sheets is provided, each first metal sheet being arranged between a respective connection end and several pressure pieces, so that an electrically conductive connection is formed between several pressure pieces via a first metal sheet. The first metal sheets, which are associated with the first connection end, are each arranged along the circumference of the rotor blade offset from the first metal sheets, (Continued)

which are associated with the second connection end. Further, a metal sheet for a segmented wind turbine rotor blade is disclosed.

27 Claims, 7 Drawing Sheets

(56) References Cited

U.S. PATENT DOCUMENTS

| | | |
|---|---|---|
| 2008/0240925 A1 | 10/2008 | Kita et al. |
| 2008/0242129 A1 | 10/2008 | Younce et al. |
| 2009/0116962 A1* | 5/2009 | Pedersen ............... F03D 7/02 |
| | | 416/61 |
| 2010/0272570 A1 | 10/2010 | Arocena De La Rua et al. |
| 2012/0100002 A1* | 4/2012 | Kawasetsu ............ F03D 80/30 |
| | | 416/229 R |
| 2014/0178205 A1* | 6/2014 | Nanukuttan ............ B23P 11/00 |
| | | 29/889.71 |
| 2017/0045032 A1 | 2/2017 | Jacobsen et al. |
| 2018/0274521 A1 | 9/2018 | Akhtar et al. |
| 2019/0264650 A1* | 8/2019 | Rubner ................ F03D 1/0658 |
| 2021/0239101 A1 | 8/2021 | Bech et al. |
| 2022/0228554 A1* | 7/2022 | Festner ................ F03D 1/0677 |
| 2022/0260051 A1* | 8/2022 | Hedges ................ F03D 1/0675 |

FOREIGN PATENT DOCUMENTS

| | | | | |
|---|---|---|---|---|
| EP | 3581790 A1 | * | 12/2019 | ........... F03D 1/0641 |
| GB | 2602463 A | * | 7/2022 | ........... F03D 1/0675 |
| WO | 2015/124568 A1 | | 8/2015 | |
| WO | 2019/206386 A1 | | 10/2019 | |

OTHER PUBLICATIONS

Search Report of the European Patent Office dated Jul. 20, 2021 for European application 21153710.5 on which this application is based.

Written Opinion of the International Searching Authority dated Apr. 12, 2022 for international application PCT/EP2022/050385 on which this application is based.

* cited by examiner

A - A

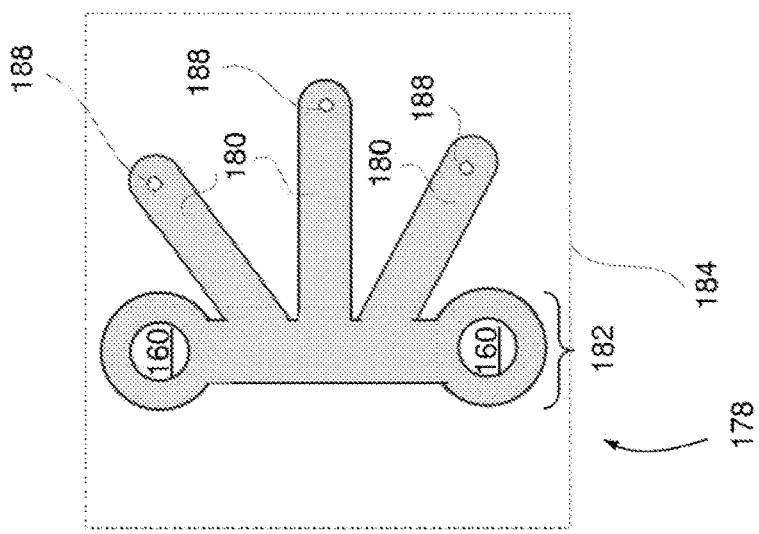
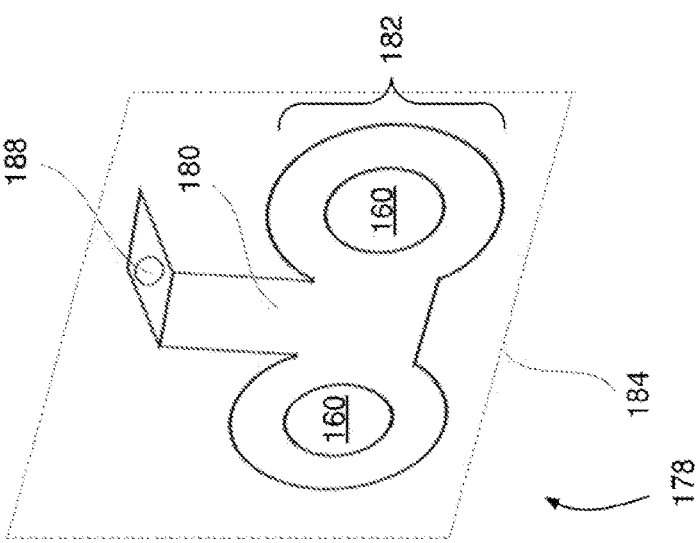
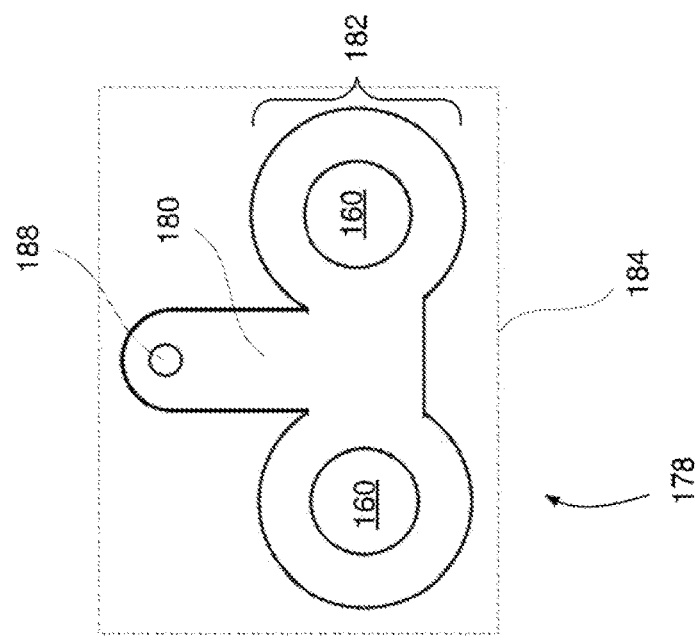

WIND TURBINE ROTOR BLADE AND METAL SHEET

CROSS-REFERENCE TO RELATED APPLICATIONS

This application is a continuation application of international patent application PCT/EP2022/050385, filed Jan. 11, 2022, designating the United States and claiming priority from European application 21153710.5, filed Jan. 27, 2021, and the entire content of both applications is incorporated herein by reference.

TECHNICAL FIELD

The disclosure concerns a wind turbine rotor blade with at least two rotor blade segments and a metal sheet for a wind turbine blade.

BACKGROUND

Wind turbines with wind turbine rotor blades are widely known from the state of the art and are used to convert wind energy into electrical energy. Wind turbines include a multitude of components which are connected to each other, for example via a flange connection. For example, in the area of a rotor blade root, the rotor blades include a rotor blade connection with a number of connecting means integrated into the laminate, via which the rotor blades are connected to a bearing ring of a so-called pitch bearing or to a component connected to the bearing ring, such as a so-called extender of the wind turbine, via fastening screws or fastening bolts. The connecting means can, for example, be configured as transverse bolts or bushings and be part of a flange insert for the rotor blade connection. Such a configuration is known from US2017/0045032.

The above described (flanged) connections are also used for connecting rotor blade segments which, arranged and joined together lengthwise, form an entire rotor blade. Such a rotor blade is called a split or segmented rotor blade. For example, connecting means are then located in the laminate of a respective connection end or dividing flange of the rotor blade segments. Segmented rotor blades are preferred especially for transport reasons and are becoming increasingly important, especially due to the increasing overall length of rotor blades.

The rotor blade segments can be connected to each other via bolts either directly or via suitable intermediate pieces. At a segmentation area of a segmented rotor blade there typically exists a gap in which the connecting means are arranged.

SUMMARY

It is an object of the present disclosure to provide a concept for segmented rotor blades that enables a reliable protection of such a gap, in particular with respect to aerodynamic and/or aeroacoustic properties and in order to resist environmental conditions. Furthermore, such protection should include a high degree of ease of assembly in the field and also offer the possibility of disassembly during maintenance work on the wind turbine.

Lightning protection systems, wherein the structural concept of the blade segmentation is not negatively affected. Further, the concept should allow the system to be installed without tools, with very little effort and under the required climatic conditions at the construction site. Furthermore, it is required that cross-sectional displacements at the segmentation area (expansions and compressions) should be tolerated and the lightning currents (tip and direct strikes) can be safely discharged to earth.

In this area, the longitudinal bolt connection is open and thus exposed to environmental conditions, which results at least in corrosion and water ingress into the interior of the rotor blade. In addition, no aerodynamic performance can be achieved in operation, since the suction and pressure sides would not generate a pressure difference in this area.

According to a first aspect a wind turbine rotor blade is disclosed, which is formed by at least two rotor blade segments. The segments are screwed together at respective connection ends via a plurality of connecting bolts. Sleeve-shaped pressure pieces are arranged between the rotor blade segments, each of which is mounted on a connecting bolt. A plurality of first metal sheets is provided, each first metal sheet being arranged between a respective connection end and several pressure pieces, so that an electrically conductive connection is formed between several pressure pieces via a respective first metal sheet. The first metal sheets, which are associated with the first connection end, are each arranged offset from the first metal sheets, which are associated with the second terminal end, with respect to the circumference of the rotor blade.

For connecting the two rotor blade segments of a wind turbine rotor blade, these typically include a large number of corresponding connecting elements, such as bushings, at the connection ends to be connected. The connecting elements are used to create a large number of bolt connections between the two segments. The assembly is configured such that the connecting bolts are first screwed into a connection end of one rotor blade segment, for example, into the bushings. Then the first metal sheets and the sleeve-shaped pressure pieces are pushed onto the connecting bolts before the free ends of the connecting bolts are threaded into the corresponding connecting element of the other rotor blade segment and at least partially screwed in. Finally, the two rotor blade segments are bolted together, whereby the connection is firmly screw-bolted and pretensioned using an assembly tool. Thus, the pressure pieces are clamped between the rotor blade segments.

Here and in the following, the explanations and features relating to the first metal sheets also apply analogously to other metal sheets described below.

The inventive wind turbine rotor blade provides that the first metal sheets are arranged offset from the root segment to the tip segment. In other words, with respect to a longitudinal axis of the blade a first metal sheet next to the tip segment does not entirely overlap with a first metal sheet next to the root segment, but only partially. In further other, for example a first metal sheet at the tip segment connects a first group of pressure pieces, whereas an opposing first metal sheet at the root segment connects one or some (but not all) pressure pieces of the first group and at least one further pressure piece not belonging to the first group. This means that in each case a section of one first metal sheet at the tip segment is electrically connected via a respective pressure piece to a section of another first metal sheet at the root segment of the blade. Due to the described arrangement of first metal sheets arranged offset to each other at both sides of the pressure pieces along the circumference of the rotor blade, a current transmission due to a lightning strike runs in a meandering manner through the pressure pieces via the first metal sheets on both sides of the pressure pieces. In other words, the first metal sheets are arranged such that a meandering electrically conductive connection is established via the pressure pieces.

For example, adjacent first metal sheets, which are associated with the first connection end, are spaced apart from each other. Adjacent first metal sheets, which are associated with the second connection end, are spaced apart from each other. This means that adjacent first metal sheets at the tip side or adjacent first metal sheets at the root side do not contact each other, that is, in an electrically conductive manner. In other words, there is no direct contact between two adjacent first metal sheets. For example, none of the first metal sheets is in direct contact, that is, touch, to any other first metal sheet.

For example, with respect to the circumference left and right ends of a first metal sheet essentially coincides with the outer ends of respective connecting elements. In other words, with respect to the circumference left and right ends of a first metal sheet do not extend over an outer most surface of a pressure piece.

For example, the first metal sheets are arranged directly at the interface between the connection end and the pressure piece, for example, at end faces of the connection end and the pressure piece, in particular at mating surfaces. The end faces do not have to be necessarily prepared or manipulated prior to installation of the first metal sheets.

The first metal sheets are arranged between each connection end of the two rotor blade segments and the pressure pieces along a circumference of the rotor blade. To connect them in an electrically conductive manner, each first metal sheet is arranged along the circumference of the rotor blade between a corresponding connection end of the blade and several adjacent pressure pieces. The pressure pieces and metal sheets are configured to be metallically conductive. In particular, the first metal sheets are clamped in the assembled state between a connection end and the pressure pieces. Thus, the metal sheets could also be named clamping sheets. The first metal sheets could include a hole or opening for each bolt to be guided through such a hole, in order for several bolt connections, for example, pressure pieces, to be coupled.

Further, a greatest possible torque is typically applied in the area where the first metal sheets are arranged, so that in addition to a geometric fit, a mechanical connection can also be used very well.

As a big advantage, the first metal sheets, for example, are of very small dimensions and/or connect only a few pressure pieces, such as four or three pressure pieces. Particularly preferably, the first metal sheets connect two pressure pieces each. In the latter case, for example, two first metal sheets are formed and arranged offset such that one half of each first metal sheet is arranged at a respective end of a pressure piece.

As already indicated above, the first metal sheets enable a meandering current transmission that is easily calculable, verifiable and well controllable. This provides the following advantages:

Compared to a continuous metal sheet extending over the entire circumference of the rotor blade or a rotor blade half shell, the disclosed solution saves material and mass.

Compared to a continuous metal clamping sheet extending over the entire circumference of the rotor blade or a rotor blade half shell, which connects all inserts with each other and thus exemplarily has to have a large number of precise holes and also has to follow the curvature of the cross-section in the segmentation area, the metal sheets according to the disclosure do not require a large chain of tolerances in shape, contour and position. Rather, these (small) first metal sheets make special use of the fact that only one short or single closely toleranced distance between a few bolt connections (pressure pieces, for example, two connections) has to fit and no, or only little, curvature is necessary. Thus, a high fitting accuracy over a theoretically infinite row of bolt connections, that is, inserts, is the result.

Compared to a continuous large metal clamping sheet extending over the entire circumference of the rotor blade or a rotor blade half shell and having wide measurements, the first metal sheets can be obtained in very accurate wall thicknesses (up to +/−0.03 mm for cold rolled precision steel strips with narrow width), in high material quality and with low manufacturing costs, at best only a 2D cut of small size is necessary.

The first metal sheets, for example, very small sheets only connecting two pressure pieces, can be produced in higher quantities, thus additionally favorably affecting their manufacture.

Compared to a continuous large clamping sheet extending over the entire circumference of the rotor blade or a rotor blade half shell, the first metal sheets contribute to a small packing size and do not require large logistical or packing efforts to get to the construction site or to be handled on the construction site. Therefore, the first metal sheets contribute to a very user-friendly installation and could be handled by only one person.

Compared to solutions that provide for mounting on other electrically conductive parts of the segmentation area and require additional fasteners for this purpose, these first metal sheets can be mounted without tools and with minimal manpower in all required climatic conditions.

Positioning of the first metal sheets in relation to a solution that would be attached to the other electrically conductive parts of the connecting means (for example, clamps on the pressure pieces) takes place nearly automatically, is highly time-saving and precise, and is also free of additional connecting means and thus the influence of errors.

Due to the offset, for example, paired, arrangement of the first metal sheets, a deformation of the segmentation cross-section can occur without any major interaction between a first metal sheet and the blade cross-section, since the less rigid area between the first metal sheets acts like a joint.

The pressure piece is configured as a sleeve, that is, the pressure piece includes a continuous bore/opening along a main direction of extension, that is, a longitudinal axis. The pressure piece is configured as a clamping sleeve, for example.

A connecting bolt, for example, is a screw bolt. The connecting bolt is, for example, configured as an expansion shaft bolt (with corresponding external threads).

The connecting elements mentioned, such as the bushings or inserts, are, for example, elements laminated into the connection ends of the blade segments.

According to an embodiment the first (and the further to be described) metal sheets are equal parts. This means that identical parts for both sides of the pressure pieces are used. This contributes to a cheaper, simpler production and a simpler assembly.

According to an embodiment a second metal sheet is provided which electrically conductively connects pressure pieces facing the leading edge and/or the trailing edge. In particular, two pressure pieces, one at the suction side and one at the pressure side, each being arranged closest to the leading edge, are coupled by the second metal sheet. Similarly, pressure pieces at the trailing edge can be connected by a second metal plate. In particular, for the connection of the shell halves within a blade segment, a modified metal sheet, namely the second metal sheet, is provided at least at the trailing edge due to the small insert distance between the pressure pieces against the risk of sparking. Advantageously additionally at the leading edge the second metal sheet enables a so-called potential equalization. The second metal sheet, for example, has a different length than the first metal sheet. The second metal sheet, for example, has a further fastening possibility for receptors or aerodynamic cover elements (see below).

According to an embodiment a third metal sheet is provided, which is arranged between a connection end and only one pressure piece, in particular in the case of a pressure piece being adjacent to the leading edge or the trailing edge. For example, the respective pressure piece is arranged closest to the leading edge or trailing edge at the suction side or the pressure side of the blade.

Depending on the configuration of the first metal sheets and amount of bolt connections it may be the case that one bolt connection might remain without a metal sheet. In this case, the third metal sheet could be arranged between a connection end and only a single pressure piece. For example in the case of first metal sheets extending over two pressure pieces, the arrangement of first metal sheets might leave at least one insert per connection end in the case of an odd number of bolt connections (or pressure pieces respectively). For example, the third metal sheet could be a modified first metal sheet, for example, in the form of a disc.

It is noted that in embodiments, none of the second and/or third metal sheets are in direct contact or touch to each other or with any first metal sheet.

According to an embodiment, one or more of the above-mentioned metal sheets, which are associated with the first rotor blade segment, are electrically conductively connected to a lightning conductor of the first rotor blade segment, and/or one or more of the above-mentioned metal sheets, which are associated with the second rotor blade segment, are electrically conductively connected to a lightning conductor of the second rotor blade segment. For example, for each segment a metal sheet on the suction side and a metal sheet on the pressure side are connected to a lightning conductor, for example, lightning conductor cable. Thus, two connections to lightning conductors are established for each rotor blade segment.

According to an embodiment, one or more of the above-mentioned metal sheets have an interface or means for attaching a further component, in particular a receptor or an aerodynamic cover. For example, a lightning receptor, which is connected to the lightning protection system, is coupled to one or more metal sheets, which is very advantageous at least in the leading edge area.

According to an embodiment, the first metal sheets are formed to connect two adjacent pressure pieces in an electrically conductive manner. The functions and advantages described above are achieved in particular by the first metal sheets.

According to an embodiment, any or all of the above-mentioned metal sheets lie flat against the corresponding end faces of the connection ends and pressure pieces. Thus a very reliable and safe mechanical and electrically conductive connection is achieved.

According to an embodiment, any or all of the above-mentioned metal sheets have one or more recesses through which the connecting bolts are guided accordingly. Depending on the number of pressure pieces to be connected, each metal sheet has corresponding recesses or holes. Thus, a very easy mounting and installation of metal sheets is enabled.

According to an embodiment, any or all of the above-mentioned metal sheets are free of contact with the respective connecting bolts. Thus, any impact on the connecting bolts, either mechanically or electrically, can be avoided.

According to an embodiment, any or all of the above-mentioned metal sheets are centered with respect to the respective connecting bolts via one or more centering rings arranged at the connection ends. Thus, a reliable, easy and safe installation of the metal sheets is possible. For example, the centering ring has one or more protrusions which engage an opening of a metal sheet to center the sheet with respect to the respective connecting bolt, which is guided through the metal sheet and the centering ring.

According to an embodiment, any or all of the above-mentioned metal sheets are fine rolled sheets. In particular, a wall thickness of a sheet is approximately up to a maximum of 5 mm sheet thickness. Such metal sheets can be produced with a very small tolerance, for example, 0.03 mm to 0.05 mm.

A further aspect is related to a metal sheet for a wind turbine rotor blade according to any of the embodiments described above. The metal sheet is configured to be arranged between a respective connection end and several pressure pieces of the wind turbine rotor blade, so that an electrically conductive connection is formed between the one or more pressure pieces via the metal sheet. In particular, the metal sheet is configured such that a connecting bolt can be passed through the metal piece.

The metal sheet essentially enables the above-mentioned advantages and functions. The above described features analogously apply to the metal sheet of the further aspect. The metal sheet can be a first, second or third metal sheet.

According to an embodiment, the metal sheet includes one or more tabs for attaching a further component, in particular the tabs including one or more eyelets for attaching the further component. The tabs can be flat, for example, extending in the main extension area of the metal sheet, or be angled, for example, at 90°. Such a configuration optimizes installation and connection of further components like a lightning receptor or the like.

BRIEF DESCRIPTION OF DRAWINGS

The invention will now be described with reference to the drawings wherein.

DETAILED DESCRIPTION

Figure 1:
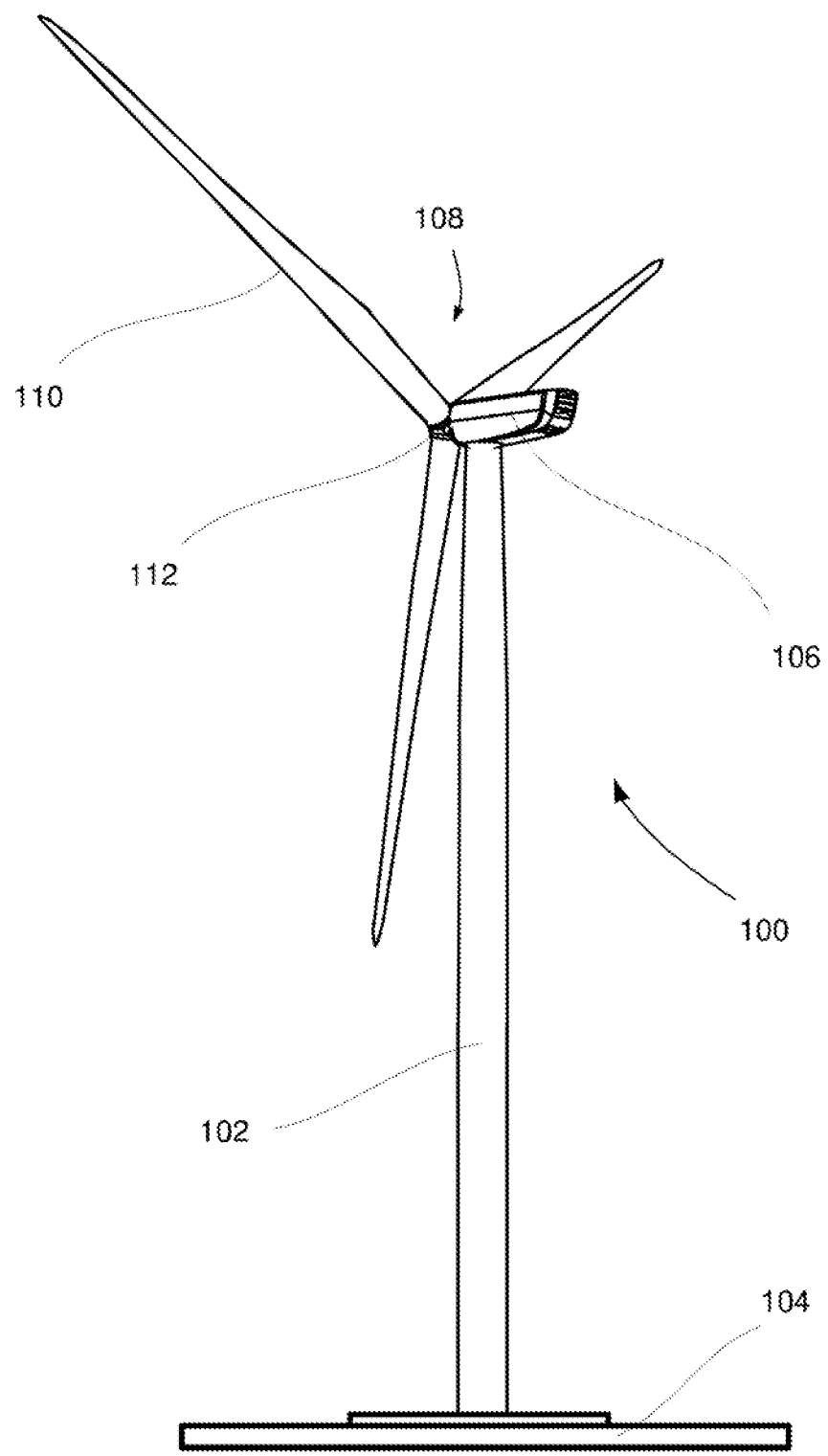
FIG. 1 shows a schematic view of a wind turbine.

FIG. 1 shows a schematic view of a wind turbine 100, which includes a tower 102. The tower 102 is fixed to the ground via a foundation 104. At one end of the tower 102 opposite to the ground a nacelle 106 is rotatably mounted. The nacelle 106, for example, includes a generator which is coupled to a rotor 108 via a rotor shaft (not shown). The rotor 108 includes one or more (wind turbine) rotor blades 110, which are arranged on a rotor hub 112.

During operation, the rotor 108 is set in rotation by an air flow, for example wind. This rotational movement is transmitted to the generator via the rotor shaft and, if necessary, a gearbox. The generator converts the mechanical energy of the rotor 108 into electrical energy.

Figure 2:
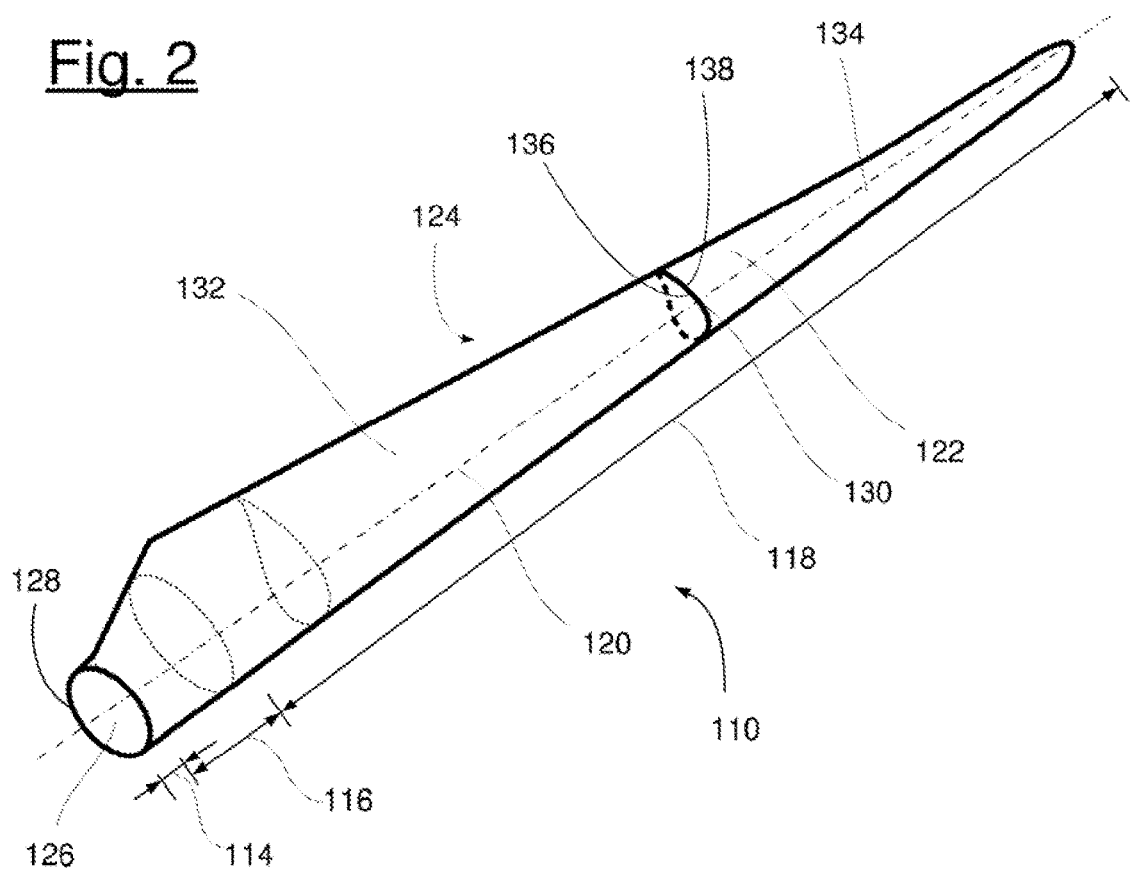
FIG. 2 shows a schematic view of a split rotor blade with two rotor blade segments.

FIG. 2 shows a wind turbine rotor blade 110. The rotor blade 110 has the shape of a conventional rotor blade and has a rotor blade root area 114 facing the rotor hub 112. The rotor blade root area 114 typically has an essentially circular cross-section. The rotor blade root area 114 is followed by a transition area 116 and a profile area 118 of rotor blade 110. The rotor blade 110 has a pressure side 122 and an opposite suction side 124 with respect to a longitudinal extension direction 120 (also main extension direction). The rotor blade 110 is essentially hollow inside.

In the rotor blade root area 114 a rotor blade connection end 126 with a flange connection 128 is provided, via which the rotor blade 110 is mechanically connected to a pitch bearing or an extender.

The rotor blade 110 includes a division area 130 where a blade root-side rotor blade segment 132 (first rotor blade segment) and a blade tip-side rotor blade segment 134 (second rotor blade segment) are connected to each other. For this purpose, both segments 132, 134 each include a segment connection area 136, 138 (also named connection ends). The rotor blade 110 is thus a split rotor blade as described above. Each connection end 136, 138 has a multitude of sleeves or bushings 140, 142, which are arranged according to the profile (in circumferential direction) and include internal threads for the reception of screw bolts, also called bearing bolts or connecting bolts. For example, the first bushings 140 include left-hand threads (first internal threads) and the second bushings 142 right-hand threads (second internal threads) or vice versa. A connection end 136, 138 is realized for example as a flange insert, which is inserted as an insert into a production mold for the manufacture of the rotor blade 110. However, it is also conceivable that no flange insert is provided and the bushings are embedded and laminated directly into the rotor blade half shells. The bushings are steel sleeves, for example.

Figure 3:
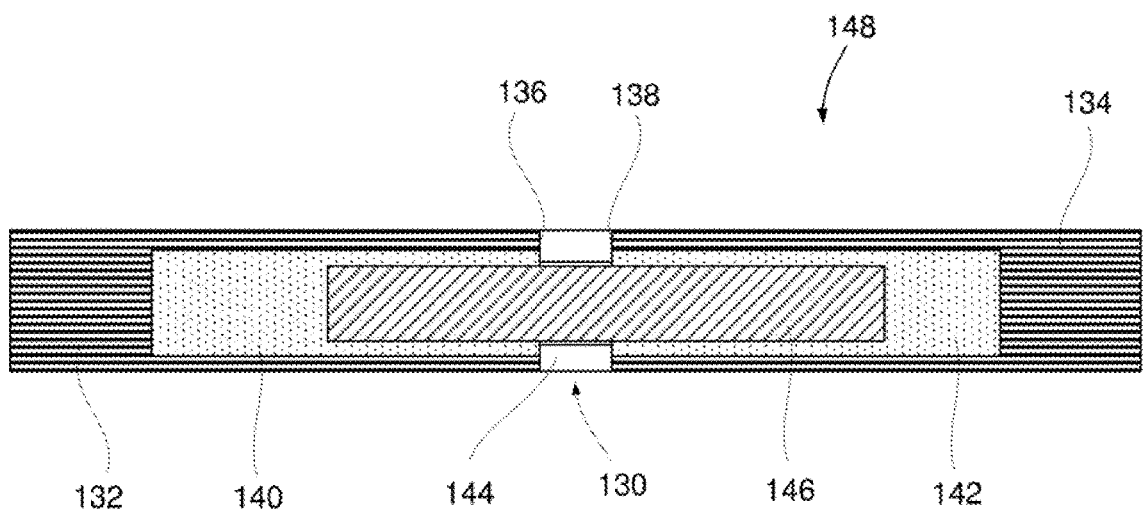
FIG. 3 shows a schematic sectional view of a bolt connection of the two rotor blade segments.

The connection of both rotor blade segments 132, 134 will be described in more detail using a single bolt connection as an example with the help of FIG. 3, which shows a schematic sectional view in the division area 130 of the two connected rotor blade segments 132, 134. The first connection end 136 of the first rotor blade segment 132 includes a multitude of first bushings 140 as described above. The second connection end 138 of the second rotor blade segment 134 includes a number of second bushings 142. A connecting bolt 146 is screwed into each pair of aligned first and second bushings 140, 142. This bolt 146 connects the two connection ends 136, 138 and thus the two rotor blade segments 132, 134 mechanically. In addition, a pressure piece 144 is clamped between the two connection ends 136, 138 per bolt connection 148.

Figure 4:
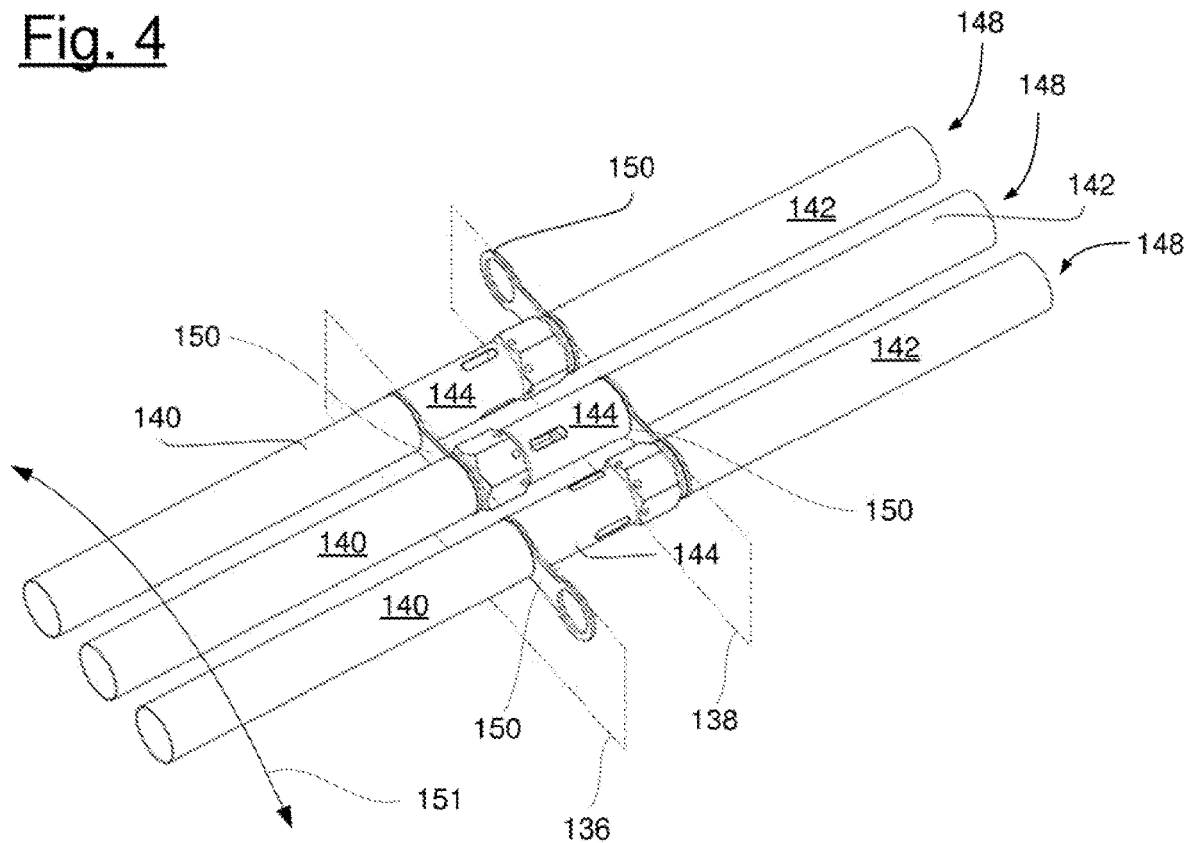
FIGS. 4, 5, 6A, 6B, 7 and 8 show different views of bolt connections of a wind turbine rotor blade according to an embodiment.
Figure 5:
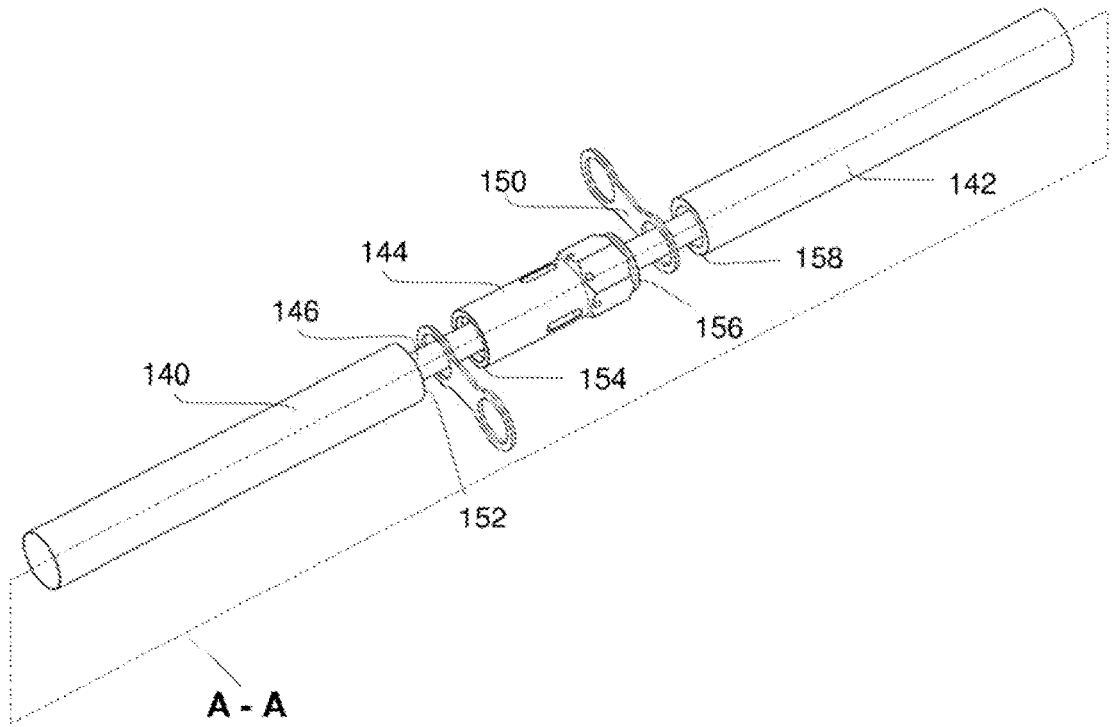

FIG. 4 shows three bolt connections 148 of a segmented wind turbine rotor blade 110 according to an embodiment of the disclosure. FIG. 5 shows one such bolt connection 148 in an explosion view. Different to the embodiment of FIG. 3, between each connection end 136, 138 of the blade 110 and the pressure pieces 144 first metal sheets 150 are clamped (also named first clamping sheets), after screwing the segments 132, 134 together via the bolts 146. In particular, the first metal sheets 150 are clamped between end faces 152 of the first bushings 140 at the first connection end 136 and first end faces 154 of the pressure pieces 144 as well as between second end faces 156 of the pressure pieces 144 and end faces 158 of the second bushings 142 of the second connection end 138.

Figure 6A:
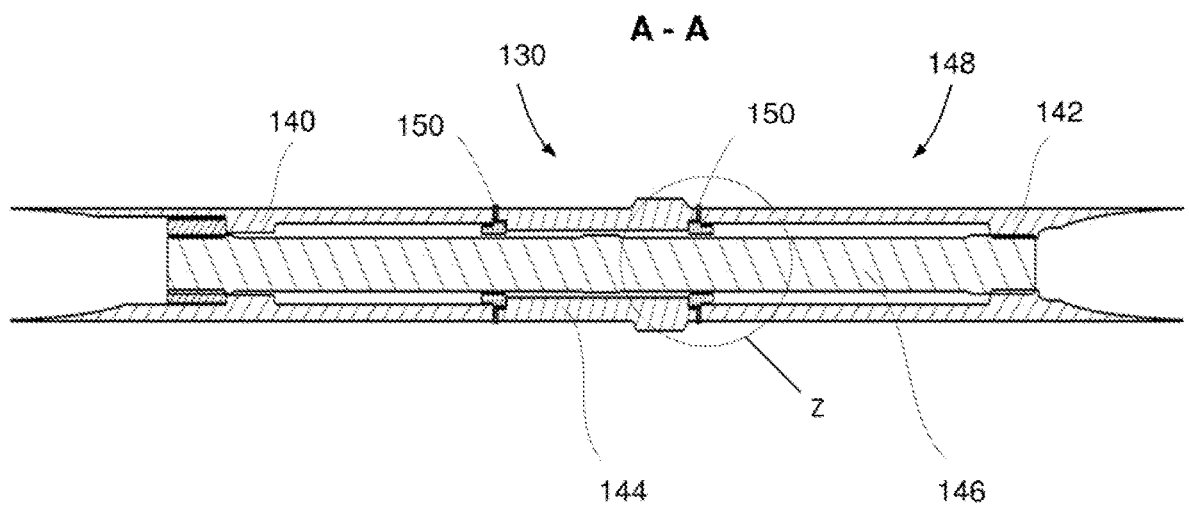
Figure 6B:
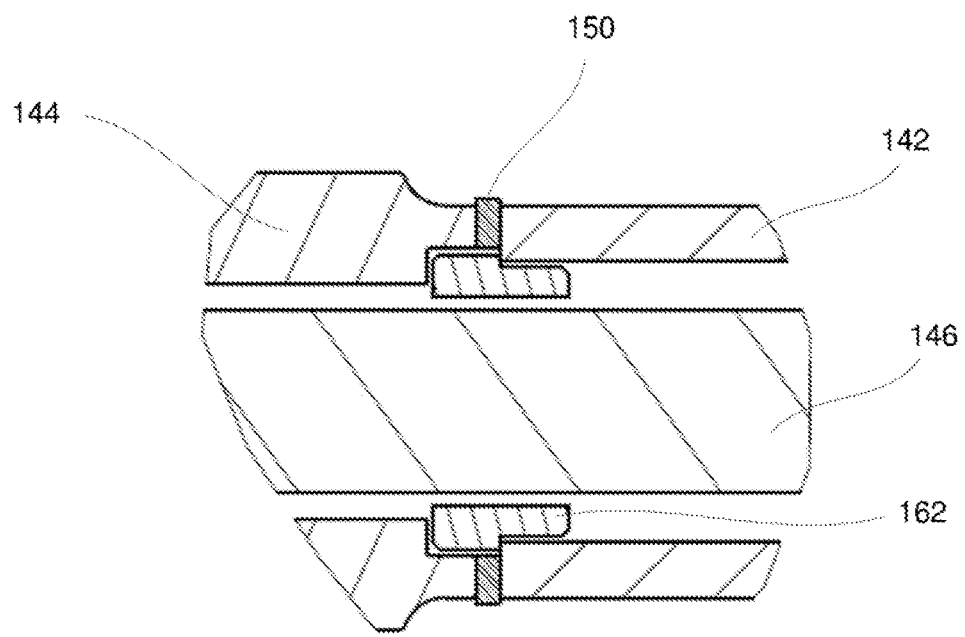

The first metal sheets 150 are arranged along the circumference 151 (indicated in FIG. 4) of the blade 110 on the suction and pressure sides 124, 122. The first metal sheets 150 are equal parts. Each first metal sheet 150 is electrically conductive and couples two pressure pieces 144 in an electrically conductive manner. In the shown embodiment, each first metal sheet 150 includes two openings 160 (recesses). Through the openings 160 the connection bolts 146 can be passed. The pressure pieces 144 correspondingly are electrically conductive, too, and formed by a respective metal for example. The first metal sheets 150 are configured and mounted between the segments 132, 134 and pressure pieces 144 such that no contact is established to the bolts 146. This can be seen in FIGS. 6A, 6B showing a sectional view A-A and a detailed view Z. In order to ensure a very easy and reliable installation, optional centering rings 162 (also named support rings) are mounted to the bushings 140, 142 and protrude through the first metal sheets 150 in order to center them with respect to the bolts 146.

As can be seen in the figures (see FIGS. 4, 5, 7, 8), each first metal sheet 150 at the first connection end 136 is arranged offset to a respective opposing first metal sheet 150 at the second connection end 138, with respect to the circumference 151 of the blade 110. Thus, in the shown embodiment one half of a first metal sheet 150 at the root-sided first connection end 136 is connected to one half of a metal sheet 150 at the tip-sided second connection end 138 via the pressure piece 144.

Figure 7:
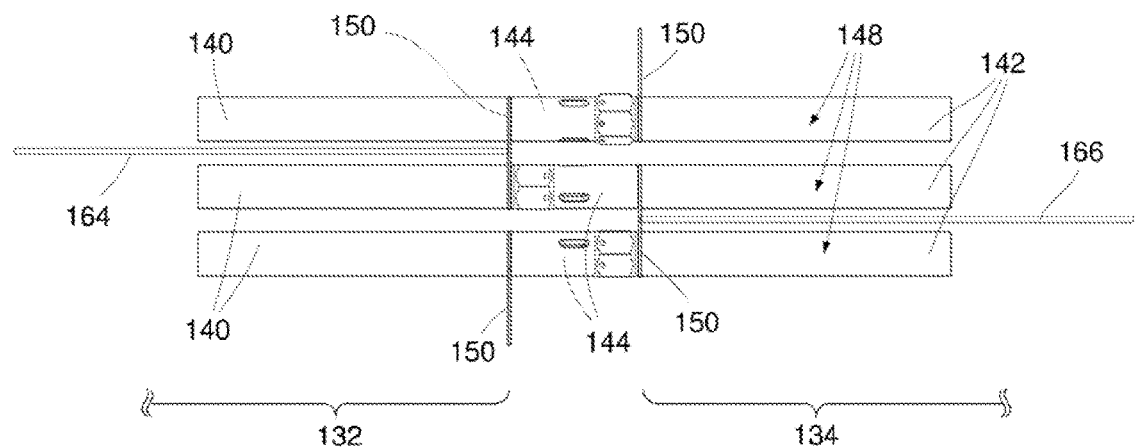

FIG. 7 shows that one first metal sheet 150, which is associated to the first connection end 136 or the first rotor blade segment 132 (root segment), is coupled to a first lightning conductor cable 164 in an electrically conductive manner. Similarly, one first metal sheet 150, which is associated to the second connection end 138 or the second rotor blade segment 134 (tip segment), is coupled to a second lightning conductor cable 166 in an electrically conductive manner. The lightning conductor cables 164, 166 are part of a lightning protection system.

In the shown example, the bolt connections 148 are arranged at the suction side 124 of the blade 110. On the pressure side 124, a similar installation is provided. Thus, further first and second lightning conductor cables 164, 166 can be provided such that each segment 132, 134 has a lightning conductor cable 164 or 166 on both the suction and pressure side 124, 122.

For the connection to the lightning conductor cables 164, 166, the first metal sheets 150 have one or more interfaces, for example, eyelets (see also FIGS. 11 to 13 and corresponding description below).

Figure 8:
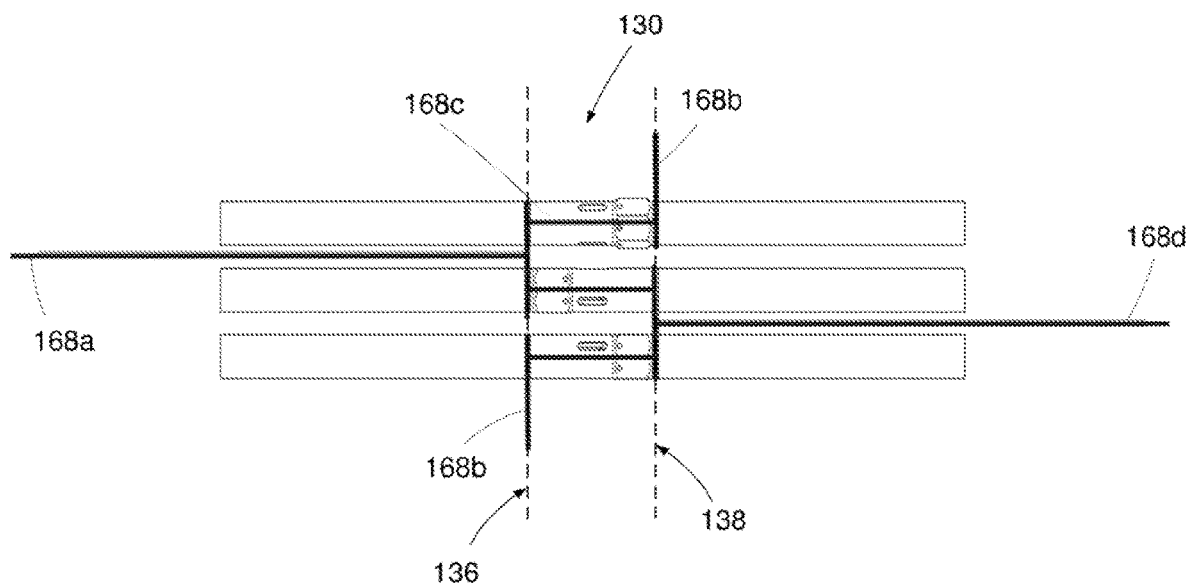

As shown in FIG. 8 the above described configuration and arrangement of first metal sheets 150 enables a meander like electrically conductive connection for the lightning protection system. In other words, a current path 168 is meander like in the division area 130 and runs from (a half of) one first metal sheet 150 at the first connection end 136 over a corresponding pressure piece 144 to (a half of) the opposing first metal sheet 150 at the second connection end 138. The current path 168 includes several sections, that is, a first segment path section 168a (lightning conductor), metal sheet path sections 168b, pressure piece path sections 168c and a second segment path section 168d (lightning conductor). In particular the metal sheet path sections 168b and the pressure piece path sections 168c establish the meander like current path.

Depending on the amount of pressure pieces 144 to be connected by one first metal sheet 150 and depending on the amount of bolt connections 148 to be established, different situations can occur, as exemplarily shown in FIGS. 9A to 10B. In particular, single bolt connections 148 (and thus respective pressure pieces 144 and bushings 140, 142) might remain free of first metal sheets 150 at the ends on the suction and pressure side 124, 122 with respect to the circumference 151 of the blade 110.

Figure 9A:
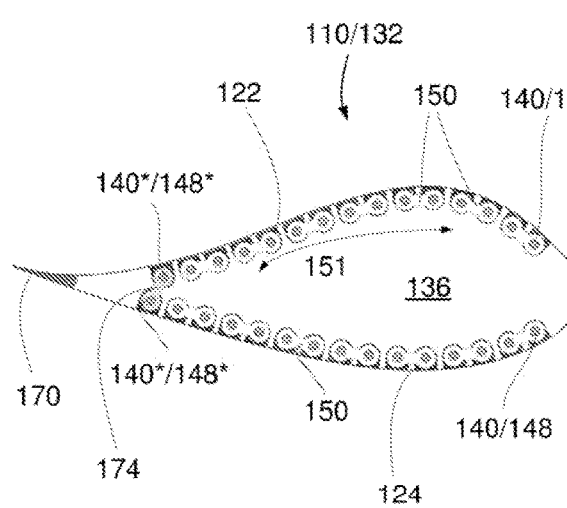
FIGS. 9A, 9B, 10A and 10B show sectional views of two different segmented wind turbine rotor blades according to embodiments of the disclosure; and, FIGS. 11 to 13 show different embodiments of a first metal sheet according to embodiments of the disclosure.
Figure 9B:
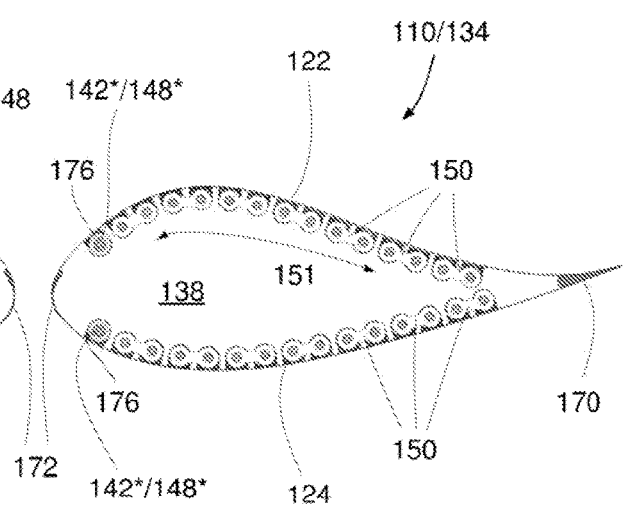

FIGS. 9A and 9B show such a wind turbine rotor blade 110 at the division area 130 according to an embodiment of the disclosure. FIG. 9A shows the first segment 132 and the first connection end 136, whereas FIG. 9B shows the second segment 134 and the second connection end 138. At both the suction and pressure side 124, 122 an odd number of bolt connections 148 (only two indicated with reference signs in FIG. 9A) is provided. At the first segment 132 the first metal sheets 150 are arranged as described above such that at both the suction and pressure side 124, 122, a single, last bolt connection 148* (last first bushing 140*) facing the trailing edge 170 would remain free of a first metal sheet 150. In this case, a second metal sheet 174 is provided, which is similar to a first metal sheet 150 and configured to connect these last bolt connections 148* (that is, the respective first bushings 140 and pressure pieces 144) in order to continue the meandering like arrangement from the suction side to the pressure side 124, 122 at the first segment 132.

Correspondingly, due to the odd number of bolt connections 148, last bolt connections 148* (last second bushings 142*) remain free of a first metal sheet 150 at the second segment 134, however at the leading edge 172 (facing the leading edge 172). At the leading edge 172, no connection from the pressure to the suction side 122, 124 is established and for each last bolt connection 148* a third metal sheet 176 is provided, for example, in the form of a disc.

Thus, the meandering like electrically conductive connection from the pressure to the suction side 122, 124 from the first to the second segment 132, 134 is achieved and between each pressure piece 144 and the connection ends 136, 138 a metal sheet (first, second and third) is provided. This ensures that each bolt connection 148, 148* has a similar mechanical arrangement, too.

Figure 10A:
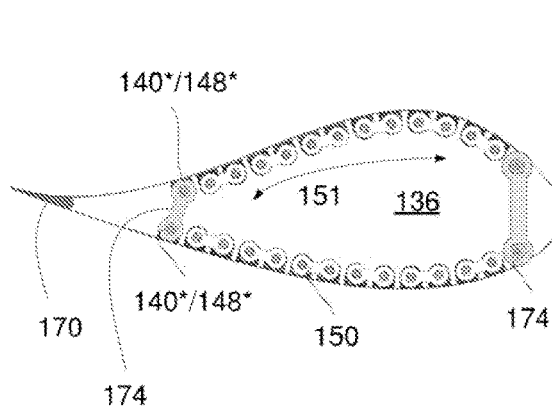
Figure 10B:
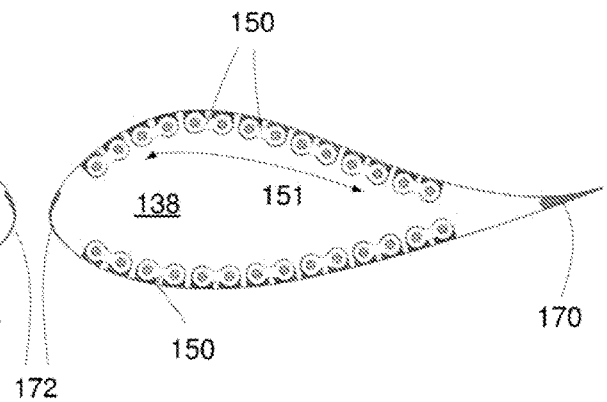

FIGS. 10A and 10B show a slightly different embodiment of the disclosure compared to the example according to FIGS. 9A and 9B. Here, an even number of bolt connections 148 is provided at the pressure and the suction side 122, 124. At the second segment 134 only first metal sheets 150 can be used and no single bolt connection 148 (that is, second bushing 142) remains free of a first metal sheet 150. At the first segment, at both ends of the suction and pressure side 124, 122 a single bolt connection 148* remains free with respect to the circumference 151. In this case, the single bolt connections 148* (for example, first bushings 140*) at the trailing edge 170 and at the leading edge 172 at the first segment 132 are conductively connected via a second metal sheet 174.

It is noted that each metal sheet 150, 174, 176 lies flat against the corresponding faces (for example, end faces of the respective pressure pieces 144). Further, each metal sheet is a fine rolled sheet as described in the introductory part.

As can be seen in the figures, the metal sheets 150, 174, 176 are not in direct electrically conductive contact with another metal sheet. In other words, each two adjacent metal sheets at one blade segment 132, 134 are not in direct contact with each other. In particular, no electrically conductive contact is established. As can be seen from the figures, with respect to the circumference 151 left and right ends of a metal sheet 150, 174, 176 essentially coincide with the outer ends of respective bushing or bushings 140, 142. In other words, with respect to the circumference 151 left and right ends of metal sheets 150, 174, 176 do not extend over an outer most end of a pressure piece 144.

FIGS. 11 to 13 show different embodiments of a metal sheet 178 for the above described rotor blades 110 and bolt connections 148/148*, which allows the attachment of lightning conductor cables (for example, discharge cables), receptors or aerodynamic cover elements. The above described features and functions with regard to a first, a second or a third metal sheet 150, 174, 176 similarly apply to the metal sheet 178. The following details are analogously applicable to a first, a second or a third metal sheet 150, 174, 176.

The metal sheet 178 includes one or more openings 160 as described above to be mounted over respective connecting bolts 146. The metal sheet 178 includes one or more tabs 180 protruding from a main body 182. The main body 182 is defined as the part of the metal sheet 178 which extends between the bolt connections 148 along the circumference 151 and connects the pressure pieces 144 and bushings 140, 142. The tabs 180 are an integral part of the metal sheet 178 and can fully extend in the main extension area 184 of the metal sheet 178 or can have an at least partially bent section 186, for example, at 90°. The tabs 180 include one or more interfaces 188 for attachment of other components. The interfaces 188 are eyelets in the shown embodiments.

The embodiments as described above enable the functions, effects and advantages as listed in the introductory part of this writing.

It is understood that the foregoing description is that of the preferred embodiments of the invention and that various changes and modifications may be made thereto without departing from the spirit and scope of the invention as defined in the appended claims.

REFERENCE SIGNS 100 wind turbine
102 tower
104 foundation
106 nacelle
108 rotor
110 rotor blade
112 rotor hub
114 rotor blade root area
116 transition area
118 profile area
120 longitudinal extension direction
122 pressure side
124 suction side
126 rotor blade connection end
128 flange connection
130 division area
132 first rotor blade segment
134 second rotor blade segment
136 first connection end (root side)
138 second connection end (tip side)
140/140* first bushing
142/142* second bushing
144 pressure piece
146 connection bolt 148/148* bolt connection
150 first metal sheet
151 circumference
152 end face of first bushing/first connection end
154 first end face of pressure piece
156 second end face of pressure piece
158 end face of second bushing/second connection end
160 opening
162 centering ring
164 first lightning conductor
166 second lightning conductor
168 current path
168a first segment path
168b metal sheet path section
168c pressure piece path section
168d second segment path section
170 trailing edge
172 leading edge
174 second metal sheet
176 third metal sheet
178 metal sheet
180 tab
182 main body
184 main extension area
186 bent section
188 interface

The invention claimed is:

1. A wind turbine rotor blade comprising:
at least two rotor blade segments including a first rotor blade segment having a first connection end and a second rotor blade segment have a second connection end;
said first rotor blade segment and said second rotor blade segment being screwed together at said first connection end and said second connection end via a plurality of connecting bolts;
a plurality of sleeve-shaped pressure pieces arranged between said first rotor blade segment and said second rotor blade segment;
each of said plurality of sleeve-shaped pressure pieces being mounted on a corresponding one of said plurality of connecting bolts;
a plurality of first metal sheets, each of said plurality of first metal sheets being arranged between one of said first connection end and said second connection end and a multiplicity of said plurality of sleeve-shaped pressure pieces so that an electrically conductive connection is formed between adjacent ones of said plurality of sleeve-shaped pressure pieces via corresponding ones of said plurality of first metal sheets; and,
said plurality of first metal sheets, which are associated with said first connection end, being each arranged along a circumference of the rotor blade offset from said plurality of first metal sheets, which are associated with said second connection end.

2. The wind turbine rotor blade of claim 1, wherein adjacent ones of said plurality of first metal sheets are spaced apart from each other.

3. The wind turbine rotor blade of claim 1, wherein said plurality of first metal sheets are equal identical parts.

4. The wind turbine rotor blade of claim 1 further comprising a second metal sheet electrically conductively connecting ones of said plurality of sleeve-shaped pressure pieces facing at least one of a leading edge of the wind turbine rotor blade and a trailing edge of the wind turbine rotor blade.

5. The wind turbine rotor blade of claim 1 further comprising a third metal sheet arranged between one of said first connection end and said second connection end and only one of said plurality of sleeve-shaped pressure pieces.

6. The wind turbine rotor blade of claim 5, wherein the wind turbine rotor blade has a leading edge and a trailing edge; and, said only one of said plurality of sleeve-shaped pressure pieces faces said leading edge or said trailing edge.

7. The wind turbine rotor blade of claim 1, wherein at least one of:
at least one of said plurality of first metal sheets, which is associated with said first rotor blade segment, is electrically conductively connected to a lightning conductor of said first rotor blade segment; and,
at least one of said plurality of first metal sheets and a second metal sheet, which is associated with said second rotor blade segment, is electrically conductively connected to a second lightning conductor of said second rotor blade segment.

8. The wind turbine rotor blade of claim 5, wherein at least one of:
at least one of said plurality of first metal sheets and said third metal sheet, which is associated with said first rotor blade segment, is electrically conductively connected to a lightning conductor of said first rotor blade segment; and,
at least one of said plurality of first metal sheets and said third metal sheet, which is associated with said second rotor blade segment, is electrically conductively connected to a second lightning conductor of said second rotor blade segment.

9. The wind turbine rotor blade of claim 4, wherein at least one of:
at least one of said plurality of first metal sheets and said second metal sheet, which is associated with said first rotor blade segment, is electrically conductively connected to a lightning conductor of said first rotor blade segment; and,
at least one of said plurality of first metal sheets and said second metal sheet, which is associated with said second rotor blade segment, is electrically conductively connected to a second lightning conductor of said second rotor blade segment.

10. The wind turbine rotor blade of claim 1 further comprising at least one of:
a third metal sheet arranged between one of said first connection end and said second connection end and only one of said plurality of sleeve-shaped pressure pieces;
a second metal sheet electrically conductively connecting ones of said plurality of sleeve-shaped pressure pieces facing at least one of a leading edge of the wind turbine rotor blade and a trailing edge of the wind turbine rotor blade; and,
wherein at least one of said plurality of first metal sheets, said second metal sheet, and said third metal sheet has an interface for attaching a further component.

11. The wind turbine rotor blade of claim 10, wherein said further component is a receptor or an aerodynamic cover.

12. The wind turbine rotor blade of claim 1, wherein at least one of said plurality of first metal sheets has an interface for attaching a further component.

13. The wind turbine rotor blade of claim 12, wherein the further component is a receptor or an aerodynamic cover.

14. The wind turbine rotor blade of claim 1, wherein said plurality of first metal sheets are formed to connect two of said plurality of sleeve-shaped pressure pieces in an electrically conductive manner.

15. The wind turbine rotor blade of claim 1 further comprising at least one of:
   a third metal sheet arranged between one of said first connection end and said second connection end and only one of said plurality of sleeve-shaped pressure pieces;
   a second metal sheet electrically conductively connecting ones of said plurality of sleeve-shaped pressure pieces facing at least one of a leading edge of the wind turbine rotor blade and a trailing edge of the wind turbine rotor blade; and,
   wherein at least one of said plurality of first metal sheets, said second metal sheet, and said third metal sheet is clamped.

16. The wind turbine rotor blade of claim 15, wherein at least one of said plurality of first metal sheets, said second metal sheet, and said third metal sheet is clamped between opposing end faces configured as mating surfaces.

17. The wind turbine rotor blade of claim 1, wherein said first connection end and said second connection end each have an end face; and, at least one of said plurality of said first metal sheets lies flat against a corresponding one of said end faces of said first connection end and said second connection end and an end face of a corresponding one of said plurality of sleeve-shaped pressure pieces.

18. The wind turbine rotor blade of claim 1 further comprising at least one of:
   a third metal sheet arranged between one of said first connection end and said second connection end and only one of said plurality of sleeve-shaped pressure pieces;
   a second metal sheet electrically conductively connecting ones of said plurality of sleeve-shaped pressure pieces facing at least one of a leading edge of the wind turbine rotor blade and a trailing edge of the wind turbine rotor blade;
   wherein said first connection end and said second connection end each have an end face; and,
   at least one of said plurality of said first metal sheets, said second metal sheet, and said third metal sheet lies flat against a corresponding one of said end faces of said first connection end and said second connection end and an end face of a corresponding one of said plurality of sleeve-shaped pressure pieces.

19. The wind turbine rotor blade of claim 1, wherein at least one of said plurality of first metal sheets has a plurality of recesses through which said plurality of connecting bolts are guided accordingly.

20. The wind turbine rotor blade of claim 1 further comprising at least one of:
   a third metal sheet arranged between one of said first connection end and said second connection end and only one of said plurality of sleeve-shaped pressure pieces;
   a second metal sheet electrically conductively connecting ones of said plurality of sleeve-shaped pressure pieces facing at least one of a leading edge of the wind turbine rotor blade and a trailing edge of the wind turbine rotor blade;
   wherein said first connection end and said second connection end each have an end face; and,
   at least one of said plurality of said first metal sheets, said second metal sheet, and said third metal sheet has a plurality of recesses through which said plurality of connecting bolts are guided accordingly.

21. The wind turbine rotor blade of claim 1, wherein at least one of said plurality of first metal sheets is free of contact with a corresponding one of said plurality of connecting bolts.

22. The wind turbine rotor blade of claim 1 further comprising at least one of:
   a third metal sheet arranged between one of said first connection end and said second connection end and only one of said plurality of sleeve-shaped pressure pieces;
   a second metal sheet electrically conductively connecting ones of said plurality of sleeve-shaped pressure pieces facing at least one of a leading edge of the wind turbine rotor blade and a trailing edge of the wind turbine rotor blade;
   wherein said first connection end and said second connection end each have an end face; and,
   at least one of said plurality of said first metal sheets, said second metal sheet, and said third metal sheet is free of contact with a corresponding one of said plurality of connecting bolts.

23. The wind turbine rotor blade of claim 1, wherein at least one of said plurality of first metal sheets is centered with respect to a corresponding one of said plurality of connecting bolts via at least one centering ring arranged at said first and second connection ends.

24. The wind turbine rotor blade of claim 1 further comprising at least one of:
   a third metal sheet arranged between one of said first connection end and said second connection end and only one of said plurality of sleeve-shaped pressure pieces;
   a second metal sheet electrically conductively connecting ones of said plurality of sleeve-shaped pressure pieces facing at least one of a leading edge of the wind turbine rotor blade and a trailing edge of the wind turbine rotor blade;
   wherein said first connection end and said second connection end each have an end face; and,
   at least one of said plurality of said first metal sheets, said second metal sheet, and said third metal sheet is centered with respect to a corresponding one of said plurality of connecting bolts via at least one centering ring arranged at said first and second connection ends.

25. A metal sheet for the wind turbine rotor blade of claim 1 comprising a metal sheet body configured to be arranged between one of the first connection end and the second connection end and at least two of the plurality of sleeve-shaped pressure pieces, so that an electrically conductive connection is formed between the at least two of the plurality of sleeve-shaped pressure pieces via the metal sheet body.

26. The metal sheet of claim 25 further comprising at least one tab for attaching a further component.

27. The metal sheet of claim 26, wherein said at least one tab includes at least one eyelet for attaching the further component.

* * * * *